Dec. 8, 1959    A. M. GOODFELLOW    2,915,850
CASTOR CUPS FOR RECEIVING CASTORS OF FURNITURE
Filed Sept. 20, 1957
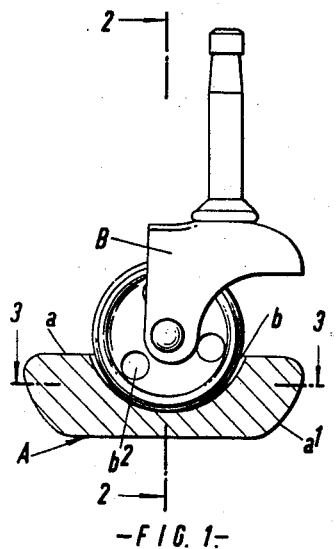
—FIG. 1.—
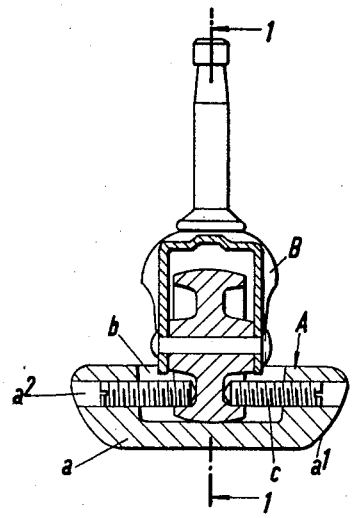
—FIG. 2.—
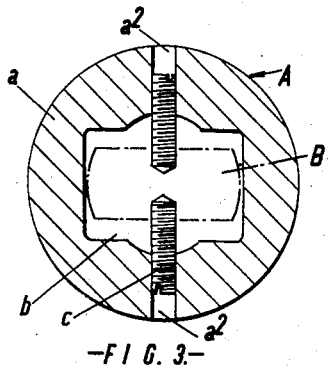
—FIG. 3.—
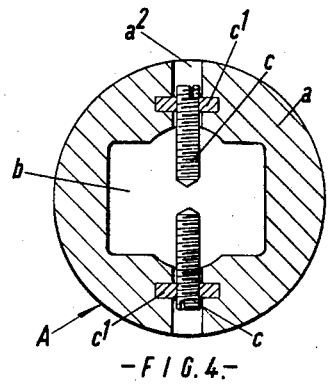
—FIG. 4.—
INVENTOR
ADA MAUD GOODFELLOW
BY
Norris & Bateman
ATTORNEYS

# United States Patent Office 2,915,850
Patented Dec. 8, 1959

2,915,850

CASTOR CUPS FOR RECEIVING CASTORS OF FURNITURE

Ada Maud Goodfellow, Manchester, England

Application September 20, 1957, Serial No. 685,311

3 Claims. (Cl. 45—137)

This invention relates to castor cups for receiving the castors on the legs of furniture.

According to the invention the castor cup comprises a block, circular in plan with rounded edges, formed with a central recess to accommodate the castor and provided with grub screws or the like extending from the peripheral edges of the block into the recess to secure the castor therein.

The invention will be described with reference to the accompanying drawings, in which:

Fig. 1 is a vertical section through the cup on line 1—1 of Fig. 2 showing in elevation the castor mounted thereon, Fig. 2 is a section on line 2—2 of Fig. 1 also showing the castor in section, Fig. 3 is a sectional plan of the cup on line 3—3 of Fig. 1, and Fig. 4 is a sectional plan of a modification of the construction shown in Figs. 1 to 3.

The castor cup A comprises a block $a$ moulded of synthetic plastic material to be circular in plan with rounded edges $a^1$ blending into the top and bottom surfaces of the block $a$. A central recess $b$ is formed in the upper surface of the block $a$ to receive the castor B.

In the form of the invention shown in Figs. 1 to 3 the peripheral edge of the block is formed with two passages $a^2$ diametrically opposite one another, each of which is tapped to receive a metal screw $c$ or the like which penetrates into the recess $b$ to engage the castor B to secure it to the block.

The screws $c$ may be pointed to give a tight grip on the castor and their heads may be sunk into the block.

In the modification shown in Fig. 4 a metal nut $c^1$ is moulded into each passage $a^2$ of the block $a$ each screw $c$ passing through a corresponding nut.

What I claim is:

1. A castor cup for receiving a castor on the leg of an article of furniture wherein said castor is provided with a flanged rim and a central hub concentrically spaced from said rim to form opposed annular recesses between said hub and said rim comprising a hard solid moulded body having an upwardly open deep recess to receive a castor, said body having its lower external peripheral portion formed with an annular diverging rounded surface for ready movement in any direction over floor surfaces and merging smoothly downwardly into a flat floor engaging surface to distribute the weight of said furniture, and two opposed screws rotatably threadedly mounted in opposite walls of the recess for inward adjustment to project into said annular recesses and to tightly grip opposite sides of said castor between said hub and said rim.

2. A castor cup for receiving a castor on the leg of an article of furniture comprising a hard solid moulded body having an upwardly open deep recess to receive a castor, said body having its lower external peripheral portion formed with an annular diverging rounded surface for ready movement in any direction over floor surfaces and merging smoothly downwardly into a flat floor engaging surface to distribute the weight of said furniture, and two opposed screws rotatably threadedly mounted in opposite walls of the recess in opposed internally threaded bores formed in said body for inward adjustment to tightly grip opposite sides of said castor.

3. A castor cup for receiving a castor on the leg of an article of furniture comprising a hard solid moulded body having an upwardly open deep recess to receive a castor, said body having its lower external peripheral portion formed with an annular diverging rounded surface for ready movement in any direction over floor surfaces and merging smoothly downwardly into a flat floor engaging surface to distribute the weight of said furniture, two opposed nuts fixed in apertures in said body, said apertures being formed inwardly of said recess and at right angles with respect to the axis thereof, and two opposed screws rotatably threadedly mounted in said nuts for inward adjustment to tightly grip opposite sides of said castor.

References Cited in the file of this patent

UNITED STATES PATENTS

| Number | Name | Date |
|---|---|---|
| 199,777 | Berry | Jan. 29, 1878 |
| 544,520 | Reiffenstein | Aug. 13, 1895 |
| 1,066,381 | Daniel | July 1, 1913 |
| 1,221,225 | Schaurmann | Apr. 3, 1917 |
| 2,850,117 | Gersmehl | Sept. 2, 1958 |